April 24, 1951 H. R. RANDLEMAN 2,550,084
WHEEL SUPPORTING SIDE MEMBER, INCLUDING A
SPRING MOUNTING THEREFOR
Filed April 8, 1948 3 Sheets-Sheet 1

Inventor

Harry Raymond Randleman

By Clarence A. O'Brien
and Harvey B. Jacobson
Attorneys

April 24, 1951                    H. R. RANDLEMAN                      2,550,084
              WHEEL SUPPORTING SIDE MEMBER, INCLUDING A
                         SPRING MOUNTING THEREFOR
Filed April 8, 1948                                          3 Sheets-Sheet 2

Inventor

Harry Raymond Randleman

By Clarence A. O'Brien
and Harvey B. Jacobson
Attorneys

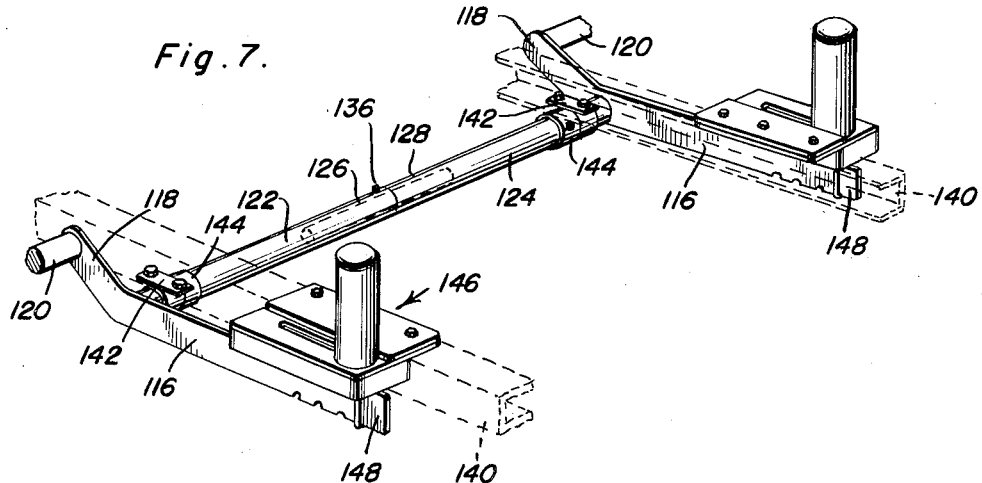
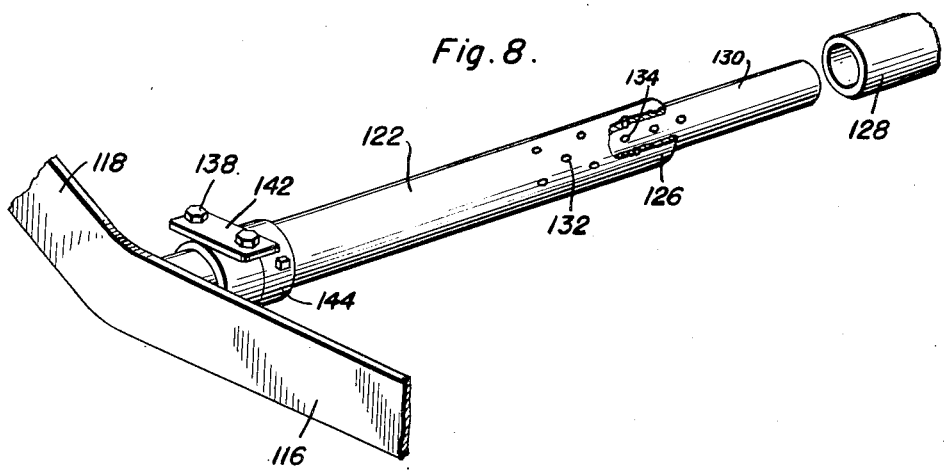

Patented Apr. 24, 1951

2,550,084

UNITED STATES PATENT OFFICE 2,550,084

WHEEL SUPPORTING SIDE MEMBER, INCLUDING A SPRING MOUNTING THEREFOR

Harry Raymond Randleman, Rogue River, Oreg., assignor of twelve and one-half per cent to Karl Feuerhelm, Rogue River, Oreg.

Application April 8, 1948, Serial No. 19,828

7 Claims. (Cl. 280—124)

This invention relates to new and useful improvements in wheeled frames such as trailers, and the primary object of the present invention is to provide a pair of wheel supporting members and embodying novel and improved means for resiliently connecting the wheel supporting members to the sides of a framework to reduce the normal jar or shock prevalent as the wheels carried by the supporting members ride over rough terrain or road surfaces.

Another important object of the present invention is to provide a wheel support for trailer frames and the like including a novel improved spring mounting or shock absorber so designed as to provide the maximum comfortable movement of a trailer and which is constructed to facilitate the parts thereof to be quickly and readily repaired or replaced in a convenient manner.

A further object of the present invention is to provide a wheel support for frameworks that is applied to or removed from frameworks of various sizes and which is adjustable for various dead and live loads.

A still further aim of the present invention is to provide a wheel support that is simple and practical in construction, strong and reliable in use, small and compact in structure, neat and attractive in appearance, efficient and durable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 7 is a fragmentary perspective view of the present invention in still further modified form applied to a trailer frame (shown in dotted lines); and Figure 8 is a group perspective view of the wheel support shown in Figure 7 and showing the same separated.

Figure 1:
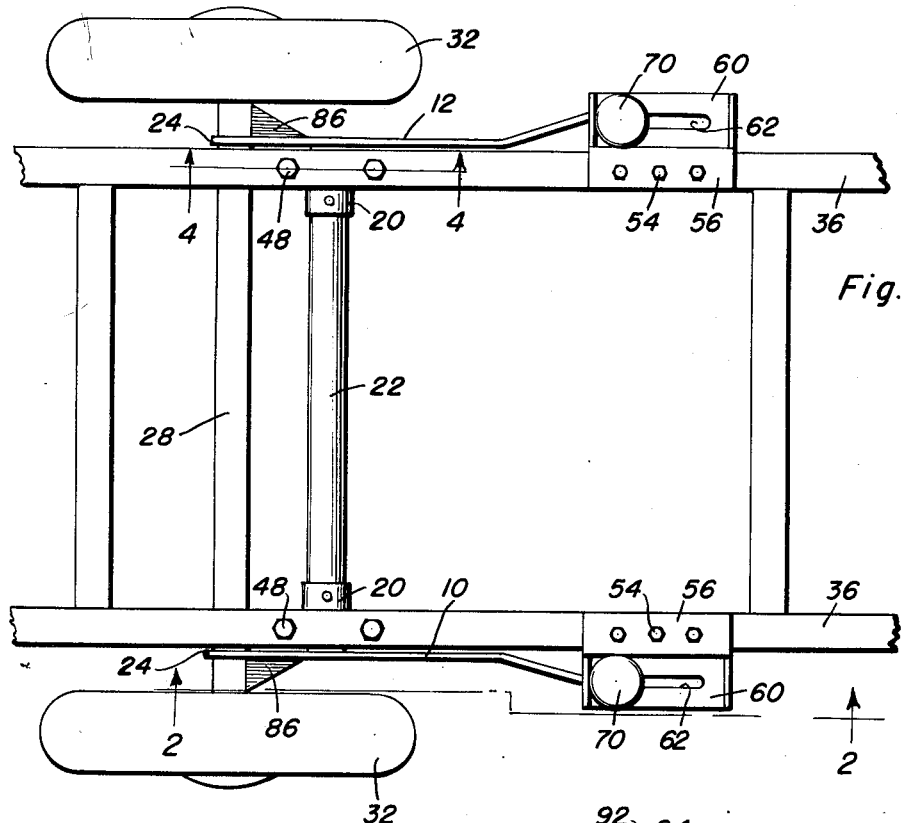
Figure 1 is a fragmentary top plan view of a trailer frame and showing the present invention applied thereto.

Referring now to the drawings in detail, wherein for the purpose of illustration, there is disclosed a preferred embodiment of the present invention, the numerals 10 and 12 represent a pair of elongated side members having reduced and offset end portions 14 the lower edges 16 of which are provided with a plurality of longitudinally spaced notches or recesses 18.

Fixed by any suitable means such as welding or the like to the inner faces of the side members 10 and 12 is a pair of sockets or sleeves 20 that removably engage the end portions of a tubular connecting member 22.

The rear end portions 24 of the side members 10 and 12 incline downwardly and are formed with notches 26 in which there is rigidly secured a bearing sleeve 28 that rotatably supports an axle or wheel supporting element 30. Wheels 32 are carried by the element 30 in any suitable manner.

The numeral 34 represents a framework such as a trailer frame that includes a pair of preferably channelled side rails 36 which are spaced parallel to each other.

Fixedly secured to the upper periphery of the sockets 20, is a pair of anchor plates 38 that engage the lower legs 40 of the side rails 36. Extending downwardly through aligned openings 42 provided in the upper legs 44 and lower legs 40 of the side rails 36 and through apertures 46 provided in the anchor plates 38, is a plurality of bolts 48, the threaded ends 50 of which receivably engage lock nuts 52 to removably secure the side members 10 and 12 to the side rails 36.

Removably secured to the side rails 36 by bolts and nuts or the like 54 is a pair of base plates 56 that are fixed to substantially channel shaped guide members 58 including bearing or guide plates 60 having longitudinal guide slots 62 that slidably engage hanger rods 64.

Bearing upon the plates 60 are removable closure plates 66 carried by the lower open ends 68 of a pair of cylindrical housings 70. The upper ends 72 of the hanger rods 64 are externally threaded to receivably engage lock nuts 74 that retain pressure plates 76 positioned on the hanger rods 64.

Biased between the closure plates 66 and the pressure plates 76 are coil springs 78 that normally retain the hanger rods 64 in a raised position.

Loosely embracing the hanger rods 64 and embraced loosely by the coil springs 78, are further coil springs 80 that are normally spaced relative to the pressure plates 76 and which cushion and limit the downward movement of the hanger rods 64.

The lower ends of the hanger rods 64 are integrally formed with loops or eye members 82 that engage the reduced end portions 14 of the side members 10 and 12. The lower edges 84 of the eye members 82 are selectively received in the notches 18 in the lower edges of the end portions 14 to retain the hanger rods 64 spaced at a predetermined distance from the sleeves 20.

In order to brace the bearing sleeve 28 to the wheel supporting element 30, there is provided a plurality of substantially triangular connecting plates 86 that are fixed to the bearing sleeve 28 and the end portions 24 of the side members 10 and 12.

Figure 6:
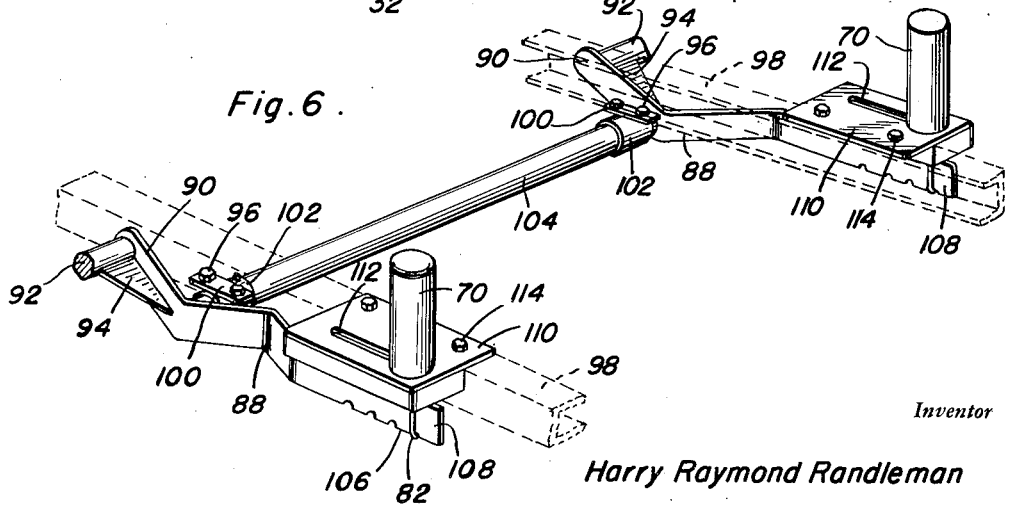
Figure 6 is a fragmentary perspective view of the present invention in slightly modified form applied to a trailer frame (shown on dotted lines)
Figure 2:
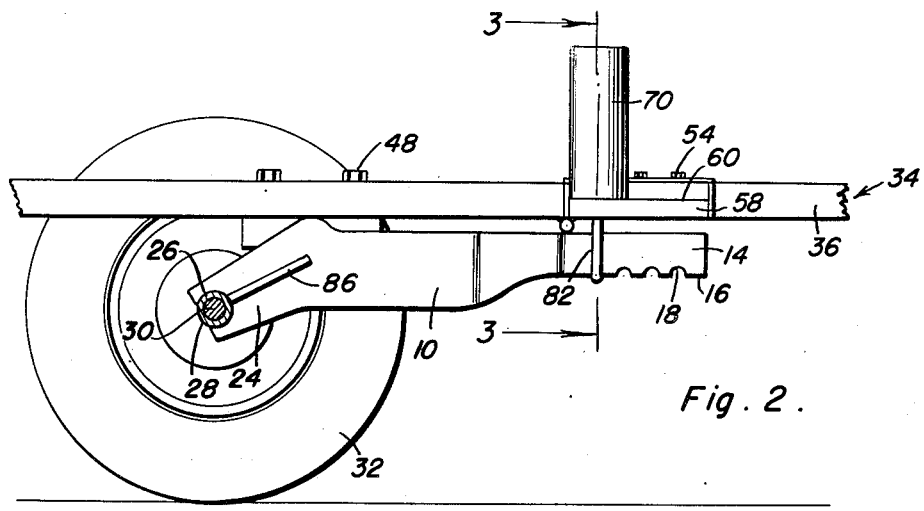
Figure 2 is a longitudinal vertical sectional view taken substantially on the plane of broken section line 2—2 of Figure 1.
Figure 4:
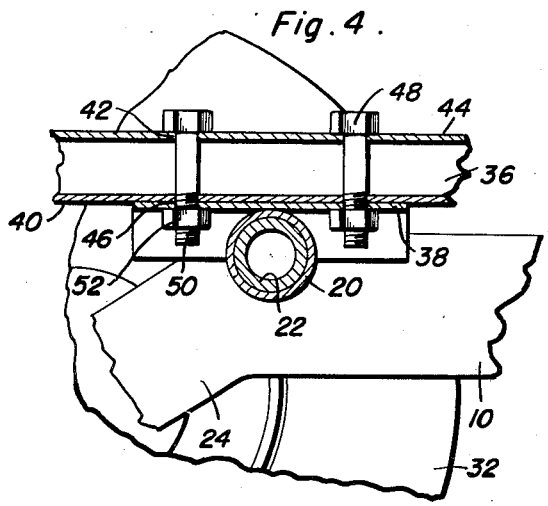
Figure 4 is an enlarged fragmentary vertical sectional view taken substantially on the plane of section line 4—4 of Figure 1.
Figure 3:
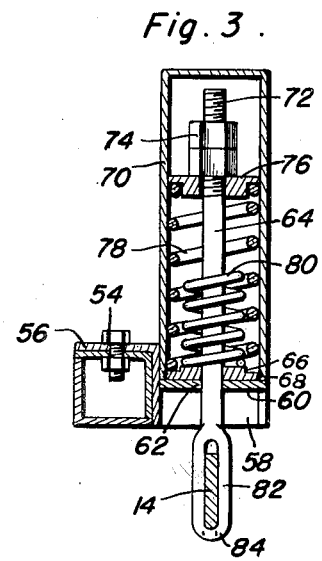
Figure 3 is an enlarged vertical sectional view taken substantially on the plane of section line 3—3 of Figure 2.
Figure 5:
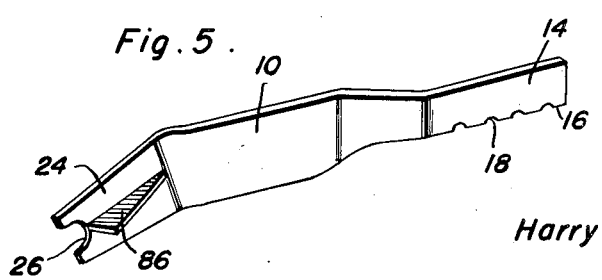
Figure 5 is a perspective view of one of the side members used in conjunction with the present invention.

Reference is now directed to Figure 6, wherein for the purpose of illustration, there is disclosed the present invention in slightly modified form. In this embodiment, the numeral 88 represents a pair of side members having upwardly inclined end portions 90 to which there is fixed stub axles 92 that are braced to the end portions 90 by rigid plates 94.

Removably secured by fasteners or the like 96 to the side rails 98 of a trailer frame is a pair of anchor plates 100 that fixedly support cooperative bearing sleeves 102.

Fixed to the side members 88, are the terminals of a connecting rod or tubular member 104 that engages the bearing sleeves 102.

The notched lower edges 106 of the forward ends 108 engage the eye members 82 of the aforementioned spring mounted hanger rods 64 which are positioned in the housings 70. These housings 70 bear upon anchor plates 110 having longitudinal slots 112 that slidably engage the hanger rods 64. The plates 110 are removably secured to side rails 98 by fasteners or the like 114. It is noted, that springs 78 and 80 are disposed within the housings 70 to function as previously described for that embodiment disclosed in Figures 1–5 of the drawings.

Reference is now directed to Figures 7 and 8, wherein for the purpose of illustration, there is disclosed the present invention in still further modified form. In this embodiment, the numeral 116 represents a pair of elongated side members having upwardly inclined end portions 118 to which there are fixed stub axles 120.

Rigidly secured to the side members 116 are the outer ends of a pair of tubular open ended members 122 and 124 the inner, aligned ends 126 and 128 of which receive a connecting rod 130. One end of the rod 130 is suitably fixed within the end 128 of the member 124. The end 126 of the member 122 is provided with a plurality of openings 132 that register with selective openings 134 provided in the rod 130. A holding pin 136 is inserted into aligned openings 132 and 134 to hold the members 122 and 124 longitudinally adjusted relative to each other.

Removably secured by fasteners 138 to the side rails 140 of a suitable frame, is a pair of anchor plates 142 that rigidly support bearing and holding sleeves 144 which engage the members 122 and 124.

A resilient connection designated generally by the numeral 146 connects the end portions 148 of the side members 116 to the side rails 140. The resilient connectors 146 are constructed in accordance with the preferred embodiment of the present invention and includes the elements shown best in Figure 3 of the drawings.

Having described the invention, what is claimed as new is:

1. In a supporting frame including a pair of side rails, a wheel support comprising a pair of side members, a wheel supporting axle carried by said side members, a pair of guide plates carried by the side rails having longitudinal slots, spring housings slidably carried by the guide plates, hanger rods positioned in said housings and slidably received in the slots, pressure plates carried by the hanger rods, spring means positioned in the housing engaging the pressure plates and normally urging the hanger rods to a raised position, means connecting the hanger rods to said side members, and further springs means limiting the downward movement of said hanger rods.

2. The combination of claim 1 wherein said further spring means includes coil springs embracing said hanger rods and normally spaced relative to the pressure plates.

3. In a supporting frame including a pair of side rails, a pair of side members, sockets carried by the side members, an elongated connecting member having its ends mounted in the sockets, means for securing the sockets to the side rails, a pair of stub axles carried by the side members, and a resilient connection between the side members and the side rails, said resilient connection between the side members and side rails including a pair of spring mounted hangers having eye terminals slidably receiving said side members, and notches provided in said side members for selectively receiving said eye terminals.

4. In a supporting frame including a pair of side rails, a wheel support comprising a pair of side members, a wheel-supporting stub axle projecting laterally from each of said side members, a pair of guide members fixed to the side rails, a pair of spring-mounted hangers slidably carried by said guide members, means adjustably securing said hangers to said side members, and connecting means between said side members.

5. In a supporting frame including a pair of side rails, a pair of side members spaced relative to said side rails and including wheel supporting axles, a pair of base plates secured to said side rails and having longitudinal slots therein, hanger rods slidably received in said slots and connected to said side members, a housing for each of said hanger rods, said housings having lower open ends, closure plates at the lower open ends of said housings resting upon said base plates, said closure plates having central openings receiving said hanger rods, pressure plates mounted on said hanger rods and received in said housings, coil springs surrounding said hanger rods and biased between said closure plates and said pressure plates to retain the hanger rods raised relative to said base plates, further coil springs embracing said hanger rods and supported on said closure plates to engage said pressure plates during downward sliding movement of said hanger rods relative to said base plates, a connection between said side members, and means for detachably securing the side members to the side rails.

6. In a supporting frame including a pair of side rails, a wheel support comprising a pair of elongated side members having first and second end portions, stub axles projecting laterally from the first end portions of said side members for supporting wheels, means adjacent the first end portion of said side members for attaching the side members to the side rails, guide members secured to the side rails and having longitudinal slots therein, hanger rods slidably received in said slots and connected to the second end portions of said side members, and spring means yieldingly retaining said hanger rods in a raised position.

7. In a supporting frame including a pair of side rails, a wheel support comprising a pair of elongated side members having first and second end portions, stub axles projecting laterally from the first end portions of said side members for supporting wheels, sleeves secured to said side rails and disposed transversely of said side rails, an elongated connector terminally secured to the first end portions of said side members, said connector being journally received in said sleeves for supporting the side members relative to said side rails, elongated guide members mounted on said side rails and having longitudinal slots therein, a pair of hanger rods received in said slots for horizontal and vertical sliding movement, said hanger rods having lower ends engaging the second end portions of said side members, and springs embracing said hanger rods and yieldingly retaining the hanger rods raised.

HARRY RAYMOND RANDLEMAN.

REFERENCES CITED

The following references are of record in the file of this patent:

UNITED STATES PATENTS

| Number | Name | Date |
|---|---|---|
| 819,302 | Munsing | May 1, 1906 |
| 1,156,909 | Koeb | Oct. 19, 1915 |
| 1,281,233 | Van Geert | Oct. 8, 1918 |
| 1,316,369 | Laisne | Sept. 16, 1919 |
| 2,227,762 | Ronning | Jan. 7, 1941 |

FOREIGN PATENTS

| Number | Country | Date |
|---|---|---|
| 225,116 | Germany | Aug. 15, 1910 |
| 418,268 | France | Dec. 5, 1910 |